Dec. 30, 1969     J. J. CURTIS ET AL     3,486,214

PIPE LAYING APPARATUS

Filed Oct. 6, 1967

INVENTORS.
JOHNNIE J. CURTIS
ROBERT M. SANDVICK
BY
Drummond & Cahill
ATTORNEYS ved. Pat Office 3,486,214
Patented Dec. 30, 1969

3,486,214
PIPE LAYING APPARATUS
Johnnie J. Curtis, Phoenix, Ariz., and Robert M. Sandvick, 3429 E. Coronado, Phoenix, Ariz. 85008; said Curtis assignor to said Sandvick
Filed Oct. 6, 1967, Ser. No. 673,423
Int. Cl. B23p 19/04
U.S. Cl. 29—237
8 Claims

ABSTRACT OF THE DISCLOSURE

A hydaulic cylinder and piston secured to a frame member pivotally attached to a screw jack for attaching to the inner diameter of large pipe. The piston is extensible by means of application of hydraulic fluid under pressure from a pump driven by an electric motor supplied by a storage cell.

---

The present invention pertains to pipe laying apparatus, and more specifically, to apparatus for forcing adjacent sections of pipe into abutting relationship.

When laying pipe, the respective sections of pipe are conventionally placed in an appropriate end-to-end position and are subsequently drawn into intermittent abutting relationship; the abutting ends of the sections of pipe characteristically utilize male and female sections to insure appropriate mating and alignment. A variety of prior art devices have been produced for forcing adjacent sections of pipe into abutting contact; however, these devices usually entail the use of heavy and complicated machinery. The prior art has attempted to provide a pipe joining scheme through the use of both internal and external tuggers as well as hydraulically operated gripping feet and gasoline-driven power sources for developing hydraulic pressure. These devices have also been used in an attempt to develop a thrust co-axial of the axis of the pipe to facilitate joining the sections of pipe; however, the co-axial relationship of the thrust requires placement of a hydraulic piston or other tugger. This placement is difficult since substantial structural members are thereby needed to support the tugger.

It is therefore an object of the present invention to provide pipe laying apparatus that may be conveniently positioned and operated by a single individual for moving adjacent sections of pipe into abutting contact.

It is another object of the present invention to provide pipe lying apparatus that is extremely lightweight and portable and can readily be manipulated by an operator without assistance.

It is still another object of the present invention to pro-provide a pipe laying apparatus utilizing self-contained power in the form of a storage cell, thereby eliminating substantial weight heretofore necessary when internal combustion engines and the like were utilized.

It is still another object of the present invention to provide pipe laying apparatus that is sufficiently diminutive to facilitate operation on an electric storage battery.

These and other objects of the present invention will become apparent to those skilled in the art as the description thereof proceeds.

Briefly, in accordance with the embodiment chosen for illustration, a frame is provided that includes a generally longitudinal axis positionable approximately parallel to the axis of the pipe in which it is to be used. The frame supports a pair of wheels rotatably mounted thereon and positioned about an axis substantially perpendicular to the longitudinal axis. The frame member is thus pivotal about this transverse axis.

A screw jack is pivotally secured to one end of the frame and includes at opposite ends thereof a pair of gripping feet for contacting the inner surface of the pipe. A hydraulic cylinder is also pivotally secured to the same pivotal axis as the screw jack; a piston within the cylinder is hydraulically actuated by hydraulic pressure applied to the cylinder from a hydraulic pump driven by an electric motor receiving energy from a wet cell battery. The present invention may more readily be described by reference to the accompanying drawing, in which.

Figure 2:
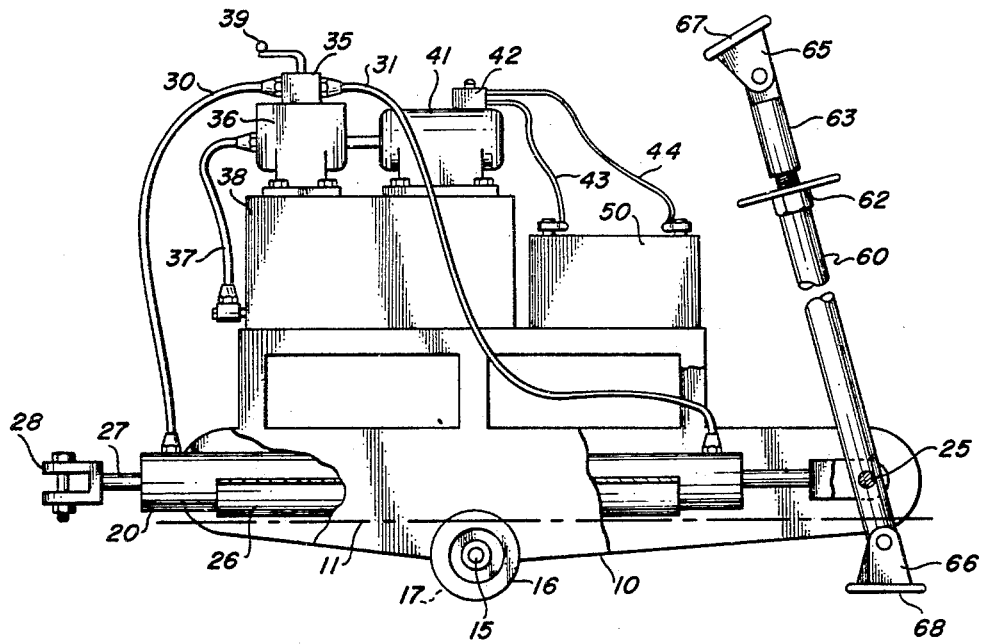
FIGURE 2 is a side elevational view, partly in section, of the pipe laying apparatus constructed in accordance with the teachings of the present invention.
Figure 1:
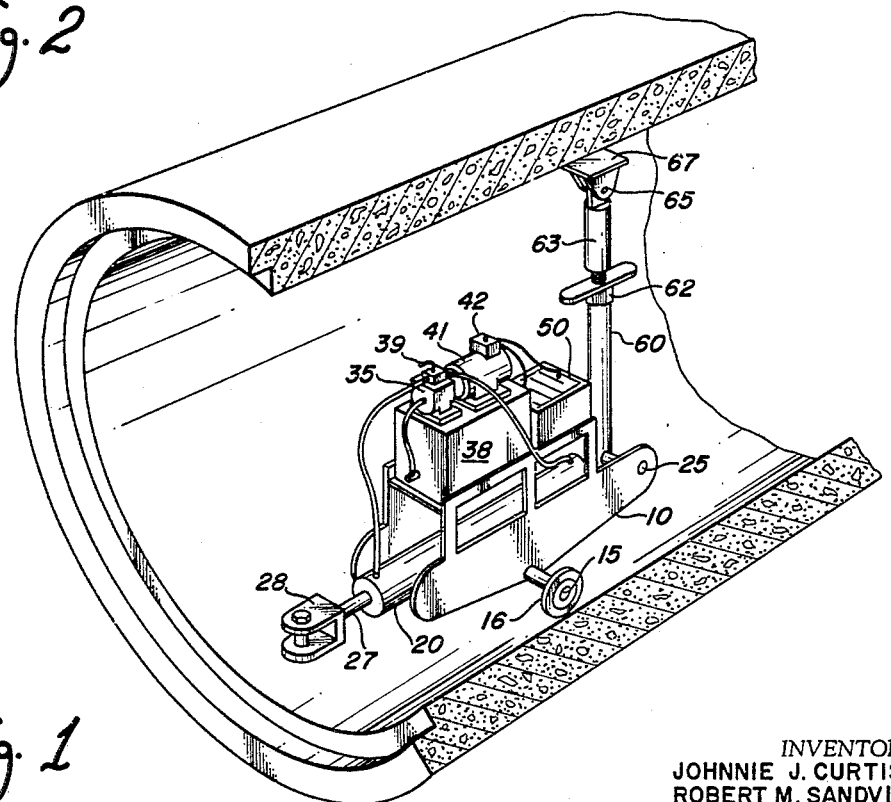
FIGURE 1 is a perspective view of pipe laying apparatus constructed in accordance with the teachings of the present invention and showing same in a section of pipe.

Referring to the drawings, an elongated frame 10 is provided and includes a generally longitudinal axis 11. This axis 11 may be positioned generally parallel to the axis 12 of the pipe 14. An axle 15 substantially transverse to the axis 11 provides a mounting means for a pair of wheels 16 and 17 rotatably positioned on either side of the frame 10. It may be noted that the axis of the axle 15 is positioned so that the frame 10 may "rock" back and forth about the axis 11. A hydraulic cylinder 20 is mounted within the frame 10 and is pivotally secured at one end thereof about a shaft 25. A supporting cradle 26 is utilized to support the cylinder 20 when not in a "tugging" position. A piston is slidably supported within the cylinder 20 and has a piston rod 27 attached to a clevis 28 that may be utilized to grasp a cable secured at the other end thereof to an adjacent section of pipe to be forced into abutting contact with the section of pipe containing the frame 10.

The hydraulic fluid for causing the piston 27 to retract or extend into or from the cylinder 20 is provided by hydraulic fluid lines 30 and 31 connected to a hydraulic control valve 35. The high pressure hydraulic fluid is provided to the control 35 from a hydraulic pump 36 connected through conduit 37 to a fluid reservoir 38. The pump 36 is driven by a direct current electric motor 41 which is operated through a pushbutton switch 42 connected through conductors 43 and 44 to a wet cell storage battery 50. The control valve 35 includes a control handle 39 to permit the high pressure hydraulic fluid to be directed to either of the conduits 30 or 31 to thus cause the piston 27 to retract into or extend from the cylinder 20 respectively.

Expandable pipe gripping means such as a screw jack 60 is provided and is pivotally connected to the frame 10 about the shaft 25. It may be noted that the screw jack 60 is pivoted about the shaft 25 at a position close to one end thereof. The screw jack includes a manually operable screw portion 62 threadedly engaging an extending portion 63 so that the overall length of the screw jack may be extended. A pair of gripping shoes 65 and 66 are pivotally secured to opposite ends of the screw jack and include a gripping face 67 and 68 respectively for contacting and frictionally engaging the interior wall surface of the pipe.

The operation of the pipe laying apparatus of the present invention may now be described. The device may readily be "wheeled" into position in a section of pipe by an operator by simply tilting the frame 10 so that the shoe 66 is out of contact with the ground and the inside of the pipe. The screw jack 60 is retracted and is tilted forward so that the device may readily enter the pipe section. When the device has been appropriately placed within the section of pipe, the longitudinal axis 11 of the frame 10 will generally be parallel to the axis of the pipe. The screw jack 60 will then be extended until the gripping surfaces 67 and 68 of the shoes 65 and 66 respectively contact and frictionally engage the inner surfaces of the pipe section. The switch 42 may then be depressed to energize the electric motor 41, causing hydraulic fluid to be delivered to the control 35. The control handle 39 will then be manipulated to cause the piston 27 to extend outwardly of the cylinder 20. The clevis 28 is then utilized to attach a cable or other securing means to a gripping device in an adjacent pipe section. The gripping device may be any of several well known devices and may take the form of another screw jack. The control handle 39 is then placed in the position to cause high-pressure hydraulic fluid to be delivered through the conduit 36 to the cylinder 20, thus causing the piston rod 27 to be retracted into the cylinder 20. It may be noted at this point that when tension is applied on the piston rod 27 by reason of its being drawn into the cylinder 20, the piston and cylinder will pivot about the shaft 25 to assume a position co-axial with the tensile forces. The pivoting of the piston and cylinder aids in maintaining solid frictional contact with the pipe section, thus enabling a single screw jack to be utilized. The positioning of the pivot about the shaft 25 and the placement of the pivot close to the shoe 66 further reduces the structural mass necessary to withstand the forces involved. If the frame 10 were connected to the screw jack at the midpoint of the latter, bending forces would tend to reduce the gripping force of the shoes against the pipe surface.

It may therefore be seen by those skilled in the art that structural integrity of the apparatus is provided by minimum mass and complexity by the design of the present invention. A conventional 12-volt wet cell battery may repeatedly be used in the apparatus of the present invention without overloading the battery and with complete safety. It is therefore intended that the present invention be limited only by the scope of the claims appended hereto.

We claim:

1. In pipe laying apparatus for temporary attachment to a section of pipe to facilitate moving adjacent sections of pipe into longitudinal abutting contact, the combination comprising: an elongated frame having a longitudinal axis positionable within a pipe section and having the longitudinal axis of said frame generally parallel to the axis of said pipe section; a pivotal axis transverse to said longitudinal axis; wheel means rotatably mounted on said pivotal axis to permit positioning of said frame; pipe gripping means for extending substantially perpendicular to the axis of said pipe section and including a pair of pipe-contacting shoes, said pipe gripping means pivotally attached to said frame at a point on said gripping means nearer one of said shoes than the other; a hydraulic piston and cylinder mounted on said frame for movement along an axis substantially parallel to said longitudinal axis; means secured to said piston and cylinder for attachment to an adjacent pipe section; means mounted on said frame for supplying hydraulic fluid under pressure to said cylinder, including an electric motor driven hydraulic pump and a storage cell for supplying energy to said electric motor; said piston and cylinder responsive to the receipt of hydraulic fluid under pressure for movement along the axis of said piston and cylinder to impart longitudinal motion to said means secured to said piston and cylinder for urging an adjacent pipe section into longitudinal abutting contact with the pipe section in which said elongated frame is positioned.

2. The combination set forth in claim 1 wherein said pipe gripping means comprises a screw jack.

3. The combination set forth in claim 1, wherein said gripping means includes a pair of gripping shoes, each pivotally secured to said gripping means for contacting the inner surface of said pipe.

4. The combination set forth in claim 1, wherein the axis of said hydraulic piston is displaced from the axis of said pipe.

5. The combination set forth in claim 2, wherein said gripping means includes a pair of gripping shoes, each pivotally secured to said gripping means for contacting the inner surface of said pipe.

6. The combination set forth in claim 2, wherein the axis of said hydraulic piston and cylinder is displaced from the axis of said pipe.

7. The combination set forth in claim 2, wherein said hydraulic cylinder is pivotally mounted on said frame.

8. The combination set forth in claim 6, wherein said gripping means includes a pair of gripping shoes, each pivotally secured to said gripping means for contacting the inner surface of said pipe.

References Cited

UNITED STATES PATENTS 2,617,548  11/1952  Falkner _____ 294—93 X
3,355,792  12/1967  Cunningham _____ 29—237

ROBERT C. RIORDON, Primary Examiner

J. C. PETERS, Assistant Examiner